(12) United States Patent
Rafferty (10) Patent No.: US 11,993,146 B2
(45) Date of Patent: May 28, 2024

(54) DEFORMABLE USER INPUT SYSTEMS

(71) Applicant: Toyota Motor Engineering & Manufacturing North America, Inc., Plano, TX (US)

(72) Inventor: John C. Rafferty, Dexter, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 360 days.

(21) Appl. No.: 17/462,568

(22) Filed: Aug. 31, 2021

(65) Prior Publication Data

US 2023/0063397 A1 Mar. 2, 2023

(51) Int. Cl.
*B60K 35/00* (2024.01)
*B60K 35/10* (2024.01)
*B60K 35/60* (2024.01)
*B60N 2/75* (2018.01)
*G06F 3/0354* (2013.01)
*G06F 3/044* (2006.01)

(52) U.S. Cl.
CPC .............. *B60K 35/00* (2013.01); *B60N 2/797* (2018.02); *G06F 3/03543* (2013.01); *G06F 3/0447* (2019.05); *B60K 35/10* (2024.01); *B60K 35/60* (2024.01); *B60K 2360/332* (2024.01); *B60K 2360/77* (2024.01)

(58) Field of Classification Search
CPC .......... B60K 2370/12; B60K 2370/133; B60K 2370/139; B60K 2370/332; B60K 2370/77; B60K 35/00; B60K 37/06; B60N 2/797; G06F 3/016; G06F 3/03543; G06F 3/0447
See application file for complete search history.

(56) References Cited

U.S. PATENT DOCUMENTS 9,937,839 B2 4/2018 Nahman et al.
9,939,900 B2 * 4/2018 Cruz-Hernandez ............ G06F 1/1652
10,133,357 B2 * 11/2018 Park .................... G06F 3/04883
10,365,818 B2 * 7/2019 Polishchuk ........... G06F 3/0488
(Continued)

FOREIGN PATENT DOCUMENTS

KR 1621369 B1 * 5/2016 ............ B60K 31/00
KR 102089448 B1 3/2020
(Continued)

OTHER PUBLICATIONS

Towards interactive car interiors: the active armrest (https://www.researchgate.net/publication/262602519_Towards_interactive_car_interiors_the_Active_Armrest), Oct. 2014.

*Primary Examiner* — Babar Sarwar
(74) *Attorney, Agent, or Firm* — DINSMORE & SHOHL LLP (57) ABSTRACT

User input systems and vehicles having a user input system having a deformable material are disclosed. In one embodiment, a user input system includes a base, a deformable material, wherein at least the base and the deformable material define an enclosure, a sensor layer disposed on or within the deformable material, at least one actuator coupled to the base and disposed within the enclosure, and an input device coupled to the at least one actuator. The at least one actuator is configured to raise the input device to deform the deformable material at a location of a hand on the deformable material based at least in part on a signal provided by the sensor layer.

20 Claims, 10 Drawing Sheets

(56) References Cited

U.S. PATENT DOCUMENTS

| | | | |
|---|---|---|---|
| 10,579,856 B2* | 3/2020 | Li | G06V 40/1318 |
| 10,591,273 B2* | 3/2020 | Veca | B60K 35/10 |
| 10,705,666 B2* | 7/2020 | Kring | G06F 3/045 |
| 11,243,614 B2* | 2/2022 | Nath | A63F 13/218 |
| 2008/0284925 A1* | 11/2008 | Han | G06F 3/0425 |
| | | | 349/12 |
| 2014/0365928 A1* | 12/2014 | Boelter | B60K 35/10 |
| | | | 715/765 |
| 2015/0185946 A1* | 7/2015 | Fourie | G06F 3/045 |
| | | | 156/60 |
| 2016/0004362 A1* | 1/2016 | Kring | G06F 3/045 |
| | | | 345/174 |
| 2016/0185267 A1* | 6/2016 | Nahman | B60K 35/50 |
| | | | 701/36 |
| 2016/0373110 A1* | 12/2016 | Koehne | F21V 23/04 |
| 2017/0024054 A1* | 1/2017 | Yairi | G06F 3/0488 |
| 2017/0052616 A1* | 2/2017 | Lin | G06F 3/044 |
| 2017/0262110 A1* | 9/2017 | Polishchuk | G06F 3/041 |
| 2017/0269785 A1* | 9/2017 | Abdollahian | G06F 3/0447 |
| 2018/0032198 A1* | 2/2018 | Suzuki | G02F 1/134363 |
| 2018/0039367 A1* | 2/2018 | Suzuki | G06F 3/0445 |
| 2018/0116605 A1* | 5/2018 | Newberry | A61B 5/01 |
| 2018/0143669 A1* | 5/2018 | Bok | G06F 1/1692 |
| 2018/0364850 A1* | 12/2018 | Vosgueritchian | G06F 3/0416 |
| 2019/0315229 A1 | 10/2019 | Petrzik et al. | |
| 2020/0331486 A1* | 10/2020 | Wieczorek | B60Q 3/10 |
| 2021/0031711 A1* | 2/2021 | Marcolino Quintao Severgnini | B60K 35/10 |
| 2021/0109596 A1* | 4/2021 | Nath | G01L 1/04 |
| 2021/0397802 A1* | 12/2021 | Arellano | G06F 3/167 |
| 2023/0021208 A1* | 1/2023 | Cazes | G06F 3/0414 |

FOREIGN PATENT DOCUMENTS

| | | |
|---|---|---|
| KR | 102100983 B1 | 4/2020 |
| KR | 20210051914 A | 5/2021 |

* cited by examiner

DEFORMABLE USER INPUT SYSTEMS

TECHNICAL FIELD

The present specification generally relates to user input systems and, more particularly, to user input systems having an input device that automatically appears at a location of a user's hand by deforming a deformable material.

BACKGROUND

As more entertainment and other features are added to vehicles, there is a need to add additional input devices to a vehicle's interior. For example, some vehicles allow the user to browse the internet or even play video games on an infotainment screen. Input devices may make these features more usable. For example, a user browsing the internet or working on a document may desire to have a mouse-like input device.

However, the inclusion of additional input devices may clutter the cabin and may only need to be available in certain situations. Further, including more input devices within the cabin and requiring a driver to interact with these input device may further distract the driver. In some cases, the input device that is needed may be difficult for the driver to reach and operate without taking his or her eyes off of the road. Additionally, soft buttons on an electronic device may be difficult for the driver to select.

Accordingly, a need exists for alternative input devices that are convenient for the user and also minimize the number of input devices that are visible within an environment such as a vehicle cabin.

SUMMARY

In one embodiment, a user input system includes a base, a deformable material, wherein at least the base and the deformable material define an enclosure, a sensor layer disposed on or within the deformable material, at least one actuator coupled to the base and disposed within the enclosure, and an input device coupled to the at least one actuator. The at least one actuator is configured to raise the input device to deform the deformable material at a location of a hand on the deformable material based at least in part on a signal provided by the sensor layer.

In another embodiment, a user input system includes a deformable material defining an enclosure, a sensor layer disposed on or within the deformable material, an input device disposed within the enclosure, at least one processor, and a non-transitory computer-readable medium. The non-transitory computer-readable medium stores instructions that, when executed by the at least one processor, causes the at least one processor to detect a user input situation, receive a signal from the sensor layer, detect a location of a user hand on the based on the signal, control the input device to move to a position within the enclosure proximate the location, and control the input device to raise to deform the deformable material at the location.

In yet another embodiment, a vehicle includes an interior surface including a deformable material and defining an enclosure, a sensor layer disposed on or within the deformable material, and an input device operable to raise and deform the deformable material at a location of a hand on the deformable material, wherein the location is based at least in part on a signal provided by the sensor layer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the appended figures, embodiments of the present disclosure are directed to user input systems that include a deformable material and an input device that appears on-demand and at a location that is convenient to the user. More particularly, the user input systems described herein may include a sensor layer on or within the deformable material that is used to determine a location of the user's hand. The user input systems may conveniently deploy an input device to the location of the users hand when user input is needed or desired. The input device is stored within an enclosure when not needed, and deforms a deformable material at the location of the user's hand when it is needed or requested.

The user input systems provide many benefits over traditional input devices. Because the input devices of the present disclosure only appear when needed, the environment may have an uncluttered design. In the vehicle context, one or more input devices may be stowed when not in use or needed and thus provide a cabin that has fewer buttons and switches that are visible.

Embodiments also eliminate the need to interrupt audio that is currently playing, the requirement for the user to use pop-ups and/or soft buttons displayed on an electronic display, and the requirement for providing audio commands, which may be ineffective and require turning off the current audio that the user is listening to. Rather, the input device needed for providing input automatically appears at the user's hand and fingertips. Thus, the user input systems described herein may reduce the distraction of providing inputs into a system, such as a vehicular system.

Figure 1:
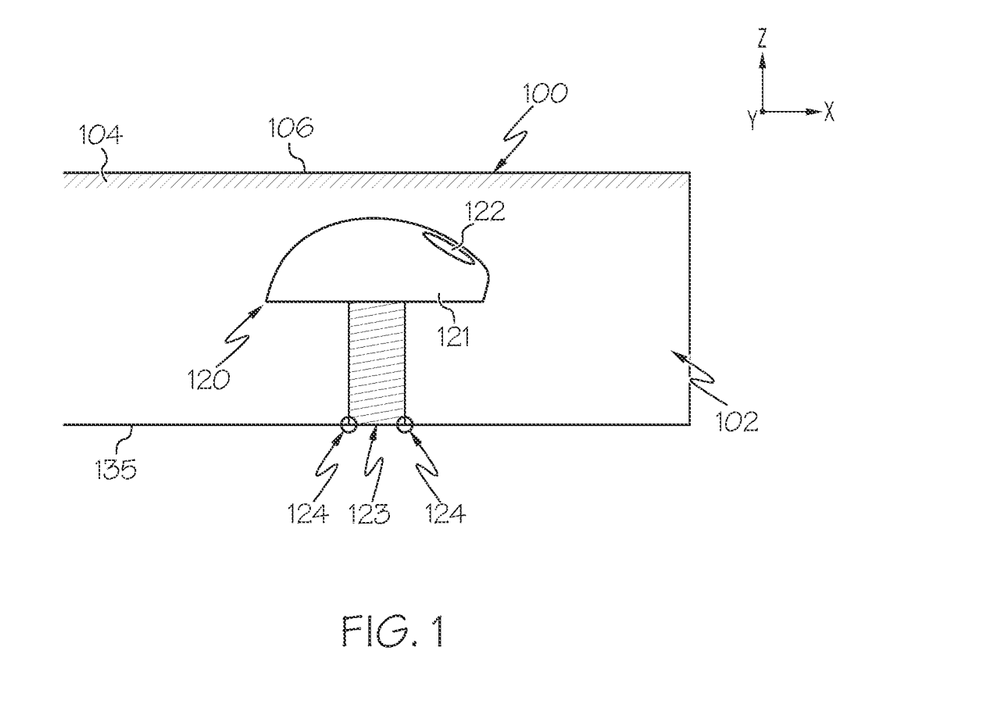
FIG. 1 schematically depicts a cross-sectional view of an example user input system wherein a user device is in a stowed state according to one or more embodiments described and illustrated herein.

Referring now to FIG. 1, a non-limiting, example user input system 100 (also referred to herein as "system 100") is schematically illustrated. The example system 100 generally includes a deformable material 104 defining an enclosure 102 and an input device 120 within the enclosure 102. In the illustrated embodiment, the input device 120 is configured as a mouse having a body 121 and buttons 122. However, as described in more detail below, embodiments are not limited to mice as the input device 120.

The deformable material 104 may be secured to a base 135 or a frame such that it has the desired shape. Together the base 135 and the deformable material 104 define the enclosure 102. As a non-limiting example, the deformable material 104 may define an interior surface of a vehicle, such as an armrest, a console, a door, a dashboard, a seat, and the like. However, it should be understood that the user input systems 100 described herein are not limited to vehicular applications. The deformable material may be any material capable of being deformed by the input device. Non-limiting examples for the deformable material are rubber, latex, neoprene rubber, vinyl, polyurethane, and the like.

The system 100 further includes a sensor layer 106 on and/or within the deformable material 104. The sensor layer 106 is operable to detect the presence of an object on the deformable material 104, such as a user's arm and/or hand. The sensor layer 106 may be a capacitive sensor layer, such as an indium-tin-oxide capacitive sensor layer operable to produce a signal providing data as to the location of the presence of a user's hand and/or arm. In other embodiments, the sensor layer 106 may be a resistance sensing layer.

In a center armrest of a vehicle, for example, the sensor layer 106 may detect a user's arm resting on the armrest and produce one or more signals providing positional contact data accordingly. A processor may receive the one or more signals and, based on the length and direction of the user's arm provided by the one or more signals (i.e., the positional contact data), determine a location of the user's hand even if the hand is not touching the armrest incorporating the user input system 100. In other cases, the user input system 100 may detect the location of the user's hand directly because the user's hand is presently contacting the sensor layer 106.

Still referring to FIG. 1, the input device 120 is configured to move in three dimensional space within the enclosure 102 to rise up to meet the user's hand at the determined location when input is needed. The input device 120 is coupled to an actuator 123 that is operable to raise and lower the input device 120 in the Z-direction. The actuator 123 may be any device capable of raising and lowering the input device 120. Non-limiting examples of the actuator include a servo motor, a linear motor, a pneumatic actuator, and a hydraulic actuator. One or more contacts 124 may be provided on the actuator to pass signals from the input device 120 to additional components, such as a processor, vehicle computer, and the like.

FIG. 1 shows the input device 120 in an unused and retracted state. Thus, the actuator 123 is retracted, thereby causing the input device 120 to not be in contact with the deformable material 104.

Figure 2:
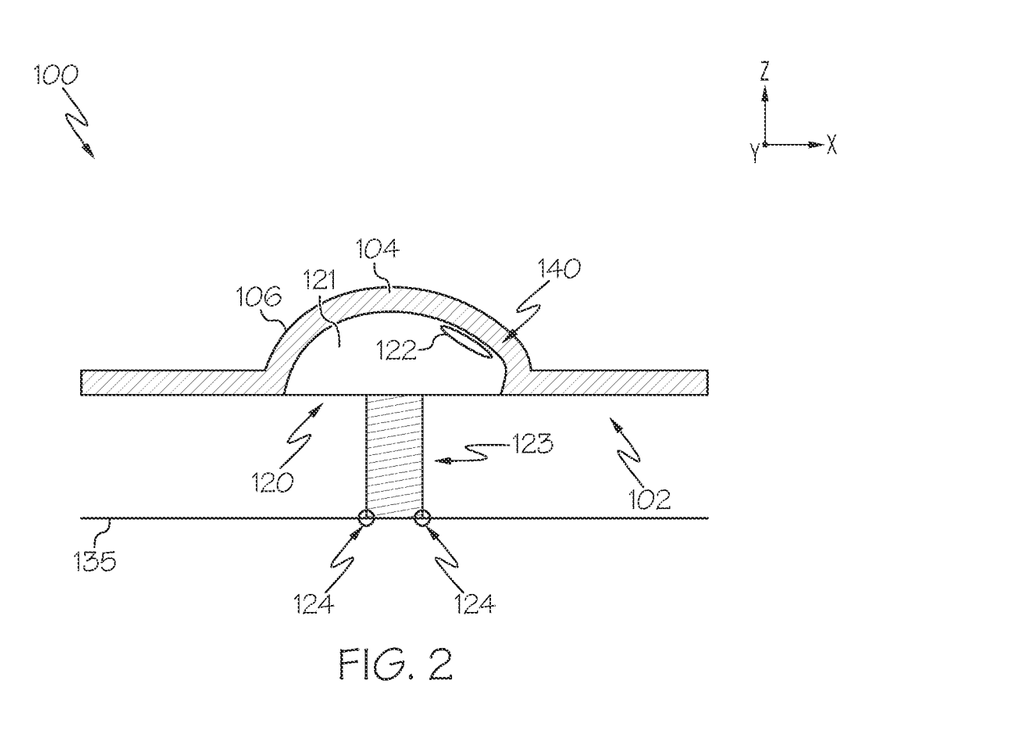
FIG. 2 schematically depicts the example user input system of FIG. 1 wherein the user device is in an extended and used state according to one or more embodiments described and illustrated herein.

FIG. 2 shows the input device 120 in an extended state that is available for use by a user. After determining the location of the user's hand on the deformable material 104 as determined by the data provided by the sensor layer 106, the input device 120 is controlled to two-dimensionally move to be positioned directly below the location of the user's hand. Next, the actuator 123 is controlled to extend, thereby raising the input device 120 up toward the deformable material 104. The actuator 123 pushes the input device 120 into the deformable material 104 such that the deformable material 104 is deformed and takes on the shape of the input device 120. In this manner, the input device 120 is available for use by the user through the deformable material 104. When the input device 120 is no longer needed, the actuator 123 retracts and lowers the input device 120 back into the enclosure 102 and the deformable material goes back to the non-deformed state.

Figure 3:
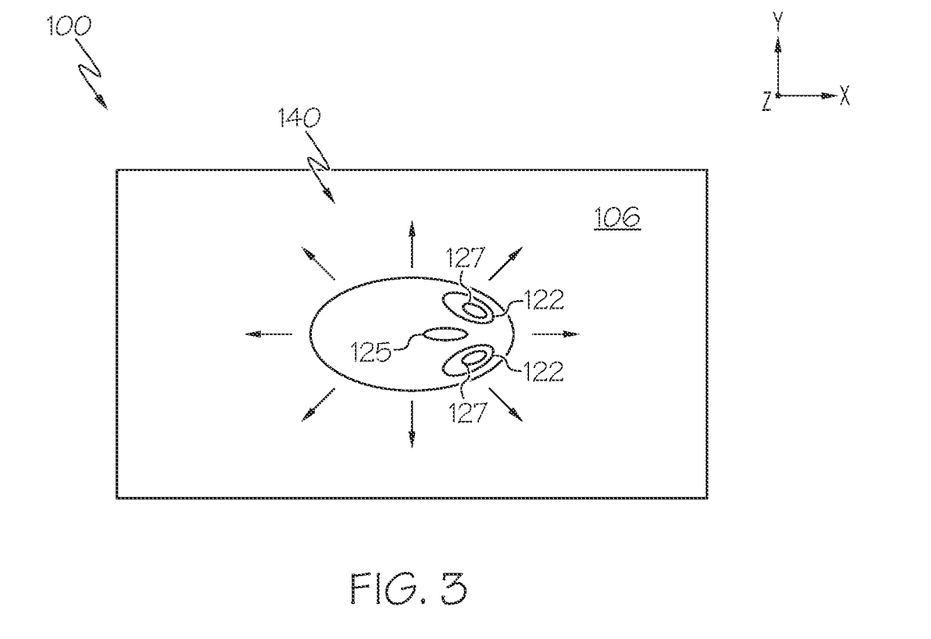
FIG. 3 schematically depicts a top view of the example user input system of FIG. 3 wherein user device is in an extended and used state according to one or more embodiments described and illustrated herein.

FIG. 3 illustrates a top view of the input device 120 appearing through the deformable material 104. For example, the user input system 100 may be incorporated into a center armrest of a vehicle. In the illustrated example, the input device 120 is free to two-dimensionally move in the X- and Y-directions as a traditional mouse. Accordingly, a user may use his hand to move the mouse (i.e., the input device 120) to provide input, such as, for example, to move a cursor on an electronic display (e.g., an electronic display of a vehicle infotainment system).

In some embodiments, the input device 120 may include one or more light sources 127 (e.g., light emitting diodes), and the deformable material 104 may be translucent such that at least some of the light emitted by the one or more light sources 127 passes through the deformable material 104. For example, the one or more light sources 127 may be provided on the buttons 122 so that the user can see the buttons in low ambient light conditions. The one or more light sources 127 may also be arranged in an array so that they may display messages, such as icons or text. In some embodiments, the input device 120 may include a scroll wheel feature 125 for additional input capabilities. For example, the sensor layer 106 may detect a swiping motion on the scroll wheel feature 125 that simulates movement of the scroll wheel feature 125 and adjust contents of a digital display accordingly. That is, the scroll wheel feature 125 may not move but the sensor layer 106 may enable the scroll wheel feature 125 to simulate input provided by a moving scroll wheel.

As another example, the buttons 122 of the input device may not be physical buttons. Rather, receipt of input may be provided by utilizing the sensor layer 106 in a manner similar to a track pad on a laptop computer. Input may be provided by the user using gestures on the locations of the buttons 122. Gestures may include a single tap, a double tap, a swiping motion, and the like. The sensor layer 106 detects the gestures and generates an input accordingly. In some embodiments, one or more light sources may be provided on the input device 120 to show the user the locations of the buttons 122.

The input device 120 may be controlled to only appear when it is needed by the user. For example, the user may provide a command (e.g., a verbal command, a command provided into a touch screen of a computing device, a tactile command, and the like) to summon the input device 120 when it is needed. As another example, the vehicle computer may determine that input is required from the user, and the vehicle computer may actuate the input device 120 to appear at the user's hand. The input device 120 may then be controlled to retract back into enclosure 102 when the vehicle computer has received the input from the user that is needed.

Figure 4:
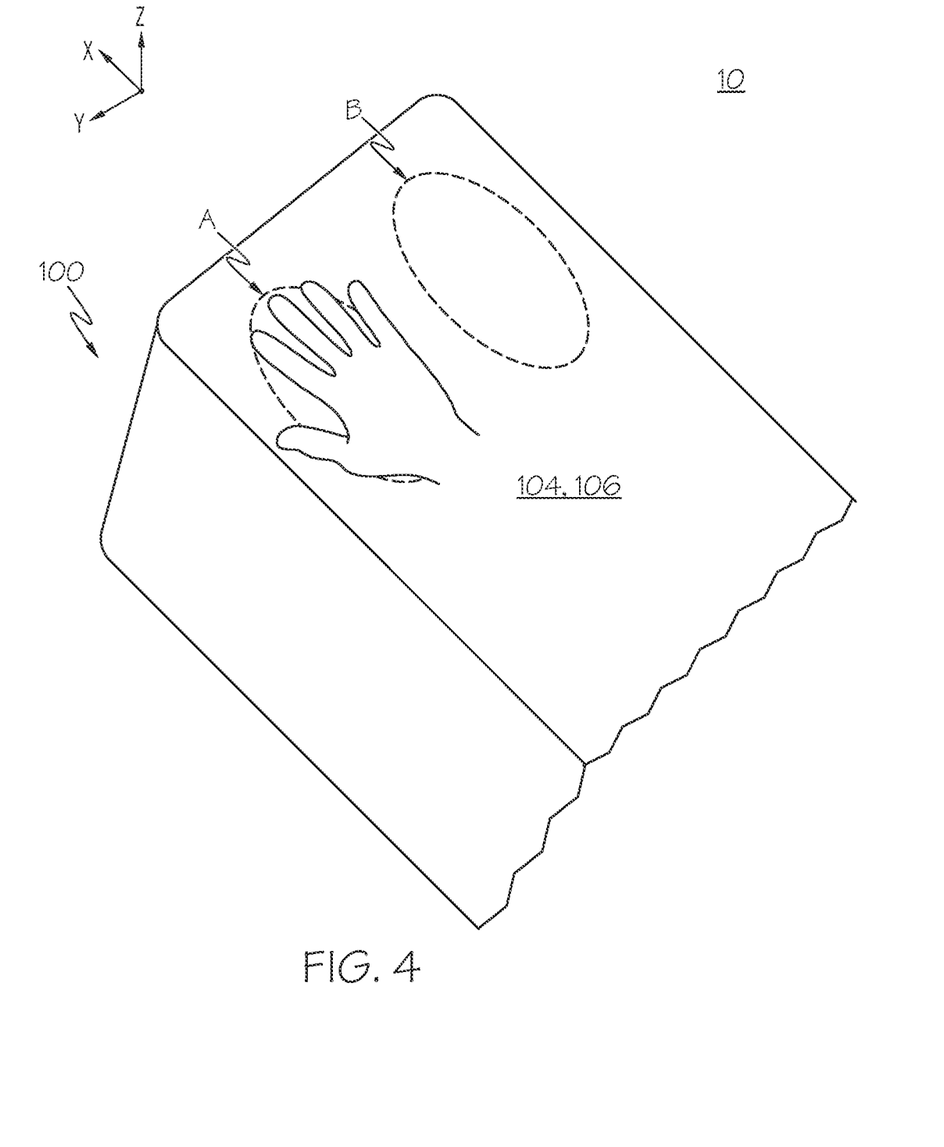
FIG. 4 schematically depicts an example user input system provided in an arm rest of a vehicle according to one or more embodiments described and illustrated herein.

FIG. 4 schematically illustrates a perspective view of a user input system 100 configured as an armrest within a vehicle 10. The user's hand 12 may be positioned at location A on the deformable material 104 defining a top surface of the armrest. However, the input device 120 may be located at a position that is beneath location B. When the user requests the input device 120, or the vehicle requires input from the user, the input device 120 may automatically and two-dimensionally moves in the X- and/or Y-directions from location B to location A. The actuator 123 may then be activated to move the input device 120 up and into the deformable material 104 in the Z-direction.

Figure 5:
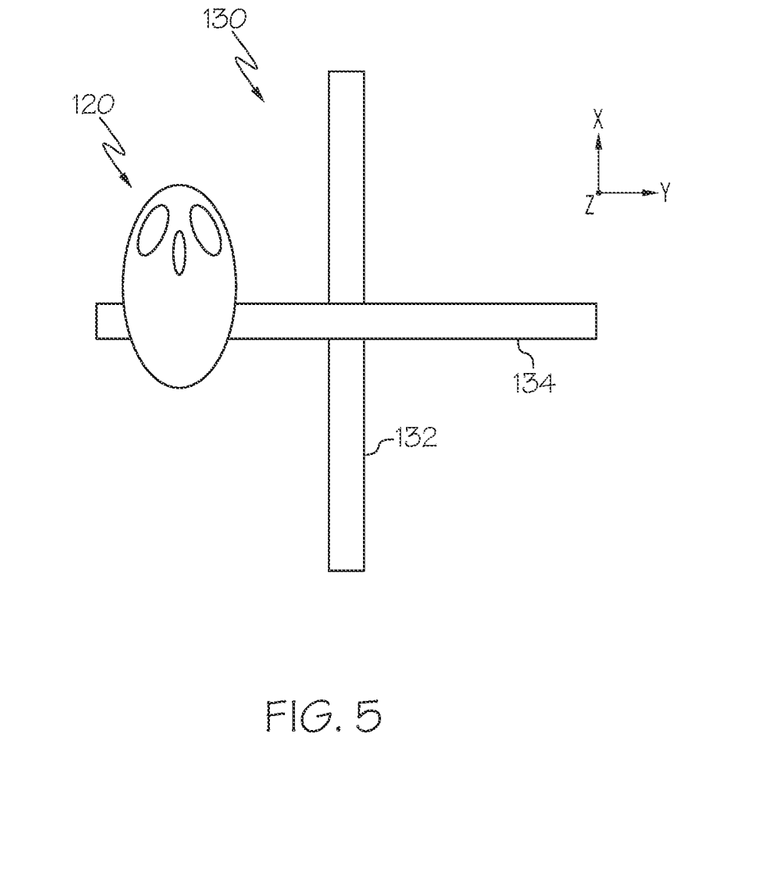
FIG. 5 schematically depicts an example track for two dimensionally moving an input device according to one or more embodiments described and illustrated herein.

The input device 120 may be configured to two-dimensionally move by any means. FIG. 5 schematically illustrates a track 130 on which the input device 120 may move in the X- and Y-directions. In the illustrated embodiment, the track 130 includes a first rail 132 arranged in the X-direction and a second rail 134 that is arranged in the Y-direction and coupled to first rail 132. Each of a first rail 132 and the second rail 134 may be configured as track actuators such that the second rail 134 travels in the X-direction on the first rail 132, and the input device travels in the Y-direction on the second rail 134. As a non-limiting example the first and second rails 132, 134 may be configured as linear motors. The first rail 132 and the second rail 134 cooperate to move the input device 120 to the desired X, Y location corresponding to the user's hand.

In some embodiments, the track 130 is used to move the input device 120 to the proper location proximate the user's hand. After the input device 120 configured as a mouse is raised up to deform the deformable material 104, the track 130 may disengage in a manner that enables the user to move the mouse (i.e., the input device 120) in the X- and Y-directions. Therefore, the user may move the input device 120 like a traditional mouse.

In some embodiments, multiple user input systems may be provided in an area surrounding a user so that an input device closest to the user's hand may appear when needed. For example, a user input system may be provided in a surface proximate the left hand and another user input system may be provided in a surface proximate the left hand. Which input device is deployed may depend on which hand is detected as being on contact with a surface of the corresponding user input surface. In a vehicle example, a first user input system may be provided at a driver left hand arm rest and a second user input system may be provided in a driver right hand arm rest. Rules may be provided to determine which input device to raise. For example, when both a right hand and a left hand are detected, the input device closest to the right hand may raise because most people are right handed. As a non-limiting example, a user may change the rule such that the input device associated with the left hand is the default input device such as in a situation where the user is left handed.

Figure 6:
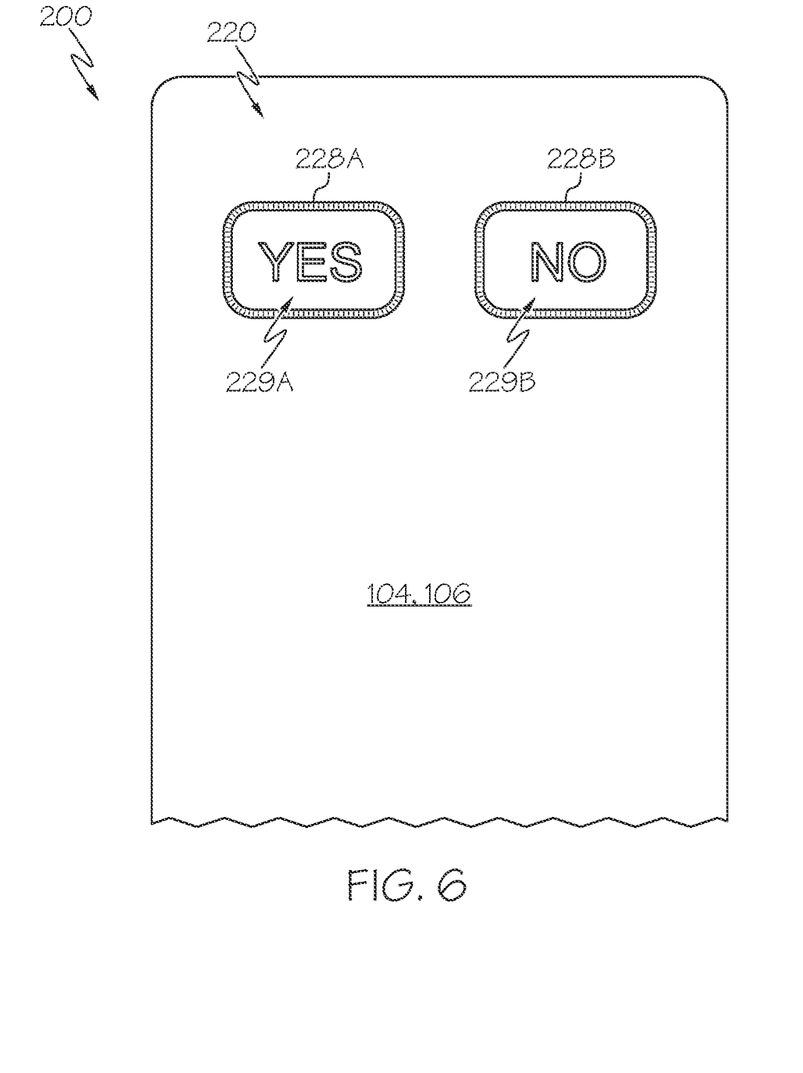
FIG. 6 schematically depicts a top view of another example user input system having an input device configured as two buttons according to one or more embodiments described and illustrated herein.

The input device may be configured as an input device other than a mouse. Referring now to FIG. 6, a user input system 200 wherein the input device 220 is configured as a first button 228A and a second button 228B that is operable to appear at the location of the user's hand. It should be understood that embodiments are not limited to two buttons and that more or fewer buttons may be provided. Each button may have its own actuator to move the button in the Z-direction, or one actuator may move each button. The first button 228A and second button 228B may include a structure to determine whether or not the user has depressed it. As non-limiting examples, the first and second buttons 228A (or the respective actuators) may include electrical contacts that when closed (or opened) provide an indication of selection, or a force sensor that provides a signal when the user selects the respective button. As another example, the sensor layer 106 may be used to detect gestures provided by the user.

In some embodiments, one or more light sources may display text or an icon through the deformable material 104. As shown in FIG. 6, the first button 228A displays a first message 229A ("YES") and the second button 228B displays a second message 229B ("NO").

The first and second buttons 228A, 228B may appear when input is needed from the user. In the vehicular example, the first and second buttons 228A, 228B may appear to ask the user a question. For example, the vehicle may present an auditory question or a visual question on the infotainment system, such as "Your battery is getting low, would you like to stop at the charging station that is 5 kilometers ahead?" When the question is asked, the first and second buttons 228A, 228B may appear at the user's hand and the user may select the appropriate button. After the desired button is pressed, the first and second buttons 228A, 228B may then retract back into the enclosure as described above.

Figure 7:
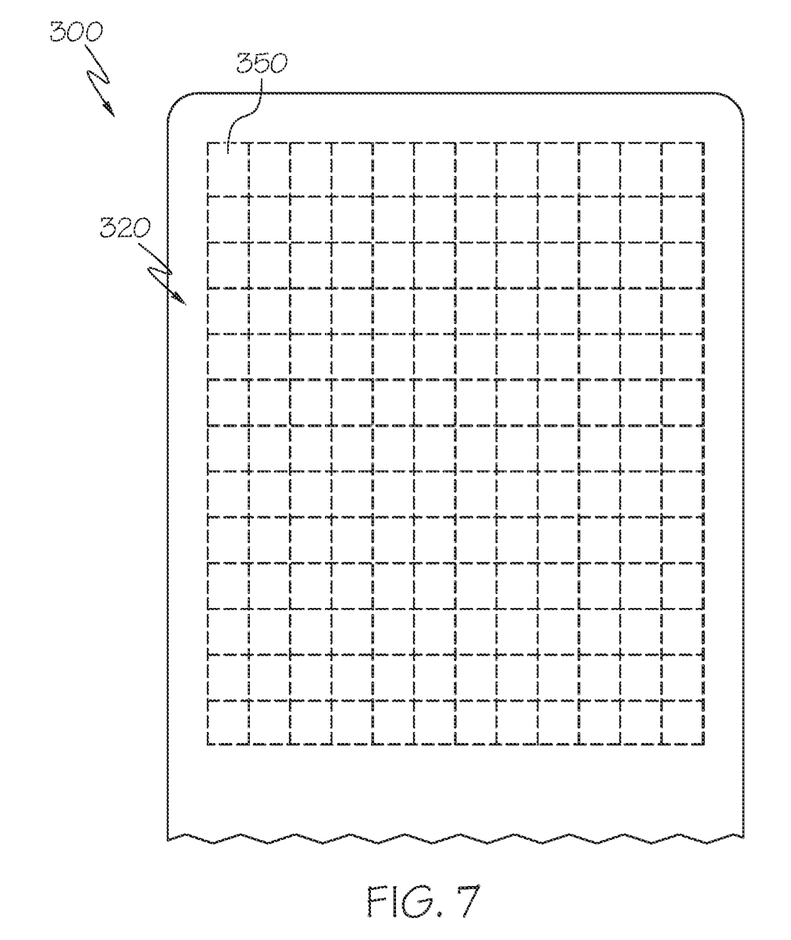
FIG. 7 schematically depicts a top view of another example user input system having an input device configured as an array of buttons according to one or more embodiments described and illustrated herein.
Figure 8:
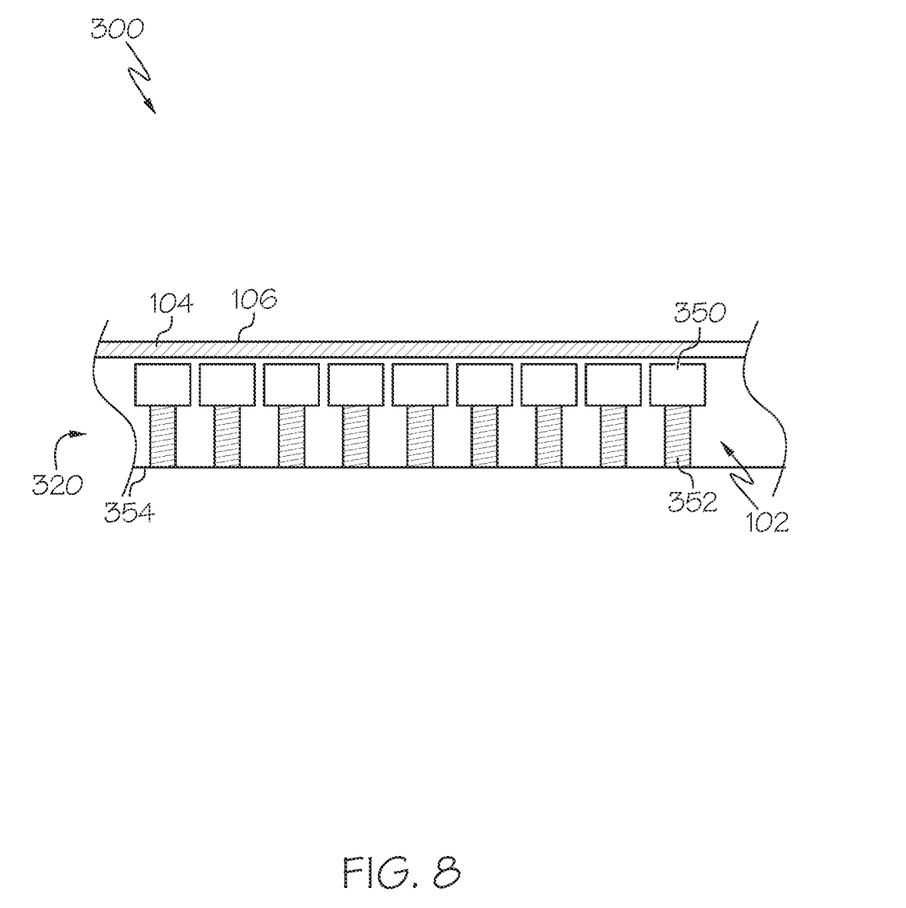
FIG. 8 schematically depicts a side internal view of the example user input system depicted by FIG. 7 according to one or more embodiments described and illustrated herein.

FIG. 7 illustrates another user input system 300 having a input device 320 comprising an array of buttons 350. Although the array of buttons 350 is configured as a plurality of rows and a plurality of columns, embodiments are not limited thereto. FIG. 8 illustrates that each button 350 is coupled to an individual actuator 352 such that each button may be individually actuated. Thus, an array of actuators 352 is coupled to a base 354 within the enclosure 102 and a the array of buttons 250.

In some embodiments, the individual buttons 350 may raise to deform the deformable material 104 to form a single input (e.g., a single button) or multiple inputs (e.g., multiple buttons) for user selection. For example, selected buttons may raise to form the YES and NO buttons that are illustrated in FIG. 6. The array of buttons 350 allow for inputs to be generated in any shape such as, without limitation, rectangular, square, circle, oval, arrow, and the like.

As a non-limiting example, only the buttons 350 proximate the location of the user's hand as detected by the sensor layer 106 may raise to create the inputs for the user. In this manner, the input or inputs may form right at the user's hand so that the user does not need to move his or her hand to provide input. This may be particularly useful in vehicular applications where a driver selecting an input may be distracting.

In some embodiments, a light source is provided on each button 350 so that the array of buttons 350 may also provide one or more messages (e.g., icons or text) to the user. Accordingly, the user input system 300 may also be configured as a three dimensional display.

As a non-limiting example, the input devices may be configured to provide haptic feedback to the user to provide information. For example, the actuators described herein may be configured to oscillate or otherwise vibrate to provide a haptic message to the user. The haptic message may be used to alert the user to the presence of the input device, provide positive feedback that an input was received by the system (e.g., a confirmation that a user's pressing of a button was received), or other functions.

Figure 9:
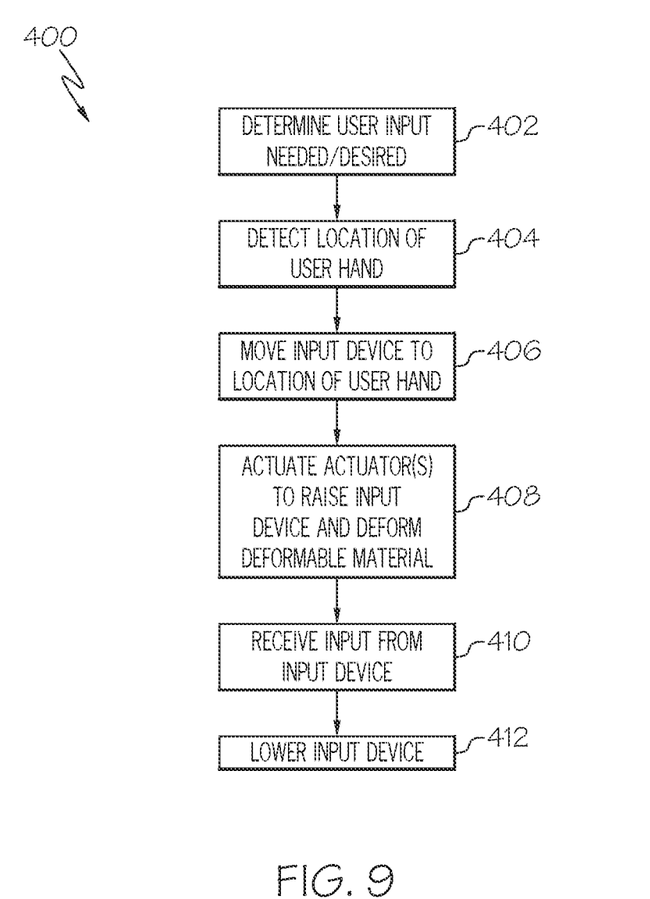
FIG. 9 graphically illustrates a method of receiving user input according to one or more embodiments described and illustrated herein.

Referring now to FIG. 9, a non-limiting method 400 for receiving input from a user is illustrated. It should be understood that methods disclosed herein are not limited by the order of steps shown in FIG. 9, and that more or fewer steps may be provided. At block 402, it is determined whether or not user input is needed or otherwise desired (i.e., it is determined if there is a user input situation). In one example, the need for user input may be driven by the user him or herself. In another example, the system, such as a vehicle, may require input from the user.

After it is determined that there is a need for user input, the process moves to block 404 where the location of the user's hand is detected. The sensor layer 106 on or within the deformable material 104 provides one or more signals to a processor of the system. Based on the one or more signals, the processor determines a location of the user's hand. The sensor layer 106 may detect the user's hand directly, or it may detect the user's arm and infer the location of the user's hand based on data collected regarding the user's arm.

Next, the process moves to block 406 where the input device 120 is moved to the location of the user's hand such that the input device 120 is below the user's hand. In embodiments where the input device is configured as an array of buttons, such as the array of buttons 350 illustrated in FIGS. 7 and 8, this block may be skipped.

At block 406, one or more actuators 123 are activated and extended to raise the input device 120 such that the input device 120 deforms a deformable material 104. Deformation of the deformable material 104 causes the input device 120 to appear and be ready for input provided by the user. In embodiments where the input device 120 is configured as a mouse, the input device 120 is then able to be two-dimensionally moved as in a traditional mouse. In some embodiments, one or more light sources emit light to provide visual messages or other information to the user.

Then, at block 410, the system receives input from the input device 120 provided by the user. The input may be movement of the mouse input device, selection of a button, or any other method of providing input. After the system receives input from the user and/or input from the user is no longer needed, the one or more actuators 123 are deactivated into a retracted state such that the input device 120 is lowered into the enclosure 102. When the input device 120 is lowered, it no longer deforms the deformable material 104 and therefore the input device 120 is no longer visible to the user.

Figure 10:
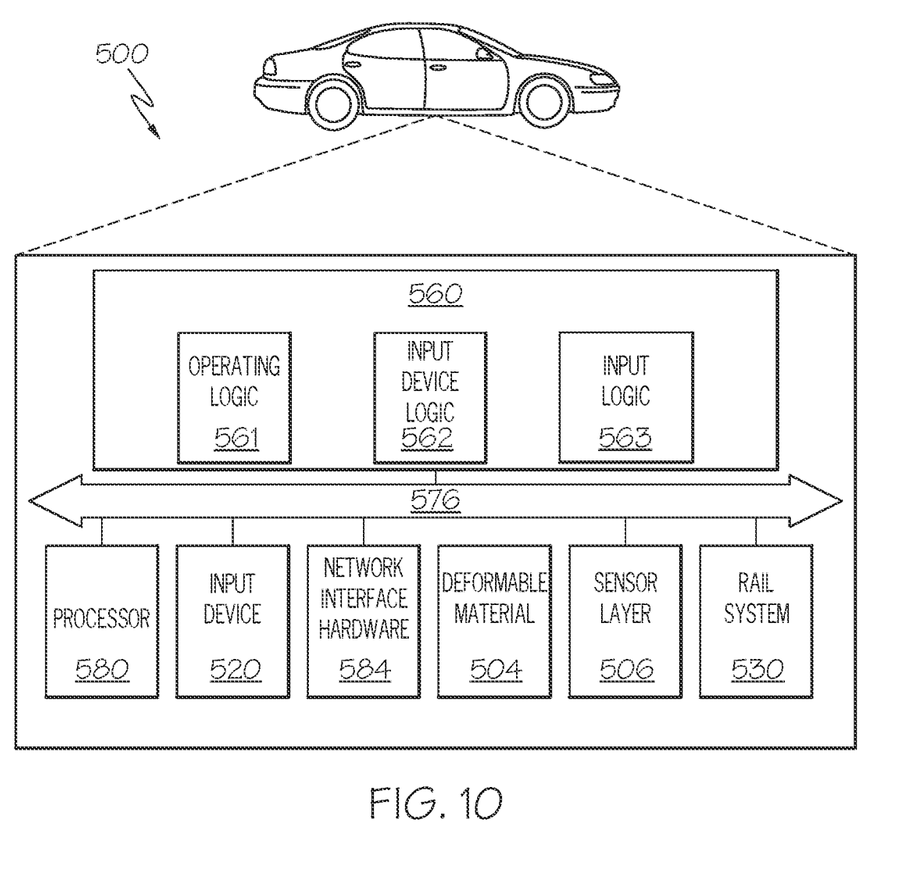
FIG. 10 schematically illustrates example computer components of a vehicle having a user input system according to one or more embodiments described and illustrated herein.

As stated above, the user input systems 100 may be provided in a computing device within in any environment such as, without limitation, vehicle environments, office environments, home environments, and manufacturing environments. FIG. 10 illustrates example components of an example vehicle 500 that includes a user input system as described herein. The example vehicle 500 provides a user input system for deploying an input device on-demand and at a location most convenient for a user, and/or a non-transitory computer-usable medium having computer readable program code for enabling on-demand deployment of input devices embodied as hardware, software, and/or firmware, according to embodiments shown and described herein. It should be understood that the software, hardware, and/or firmware components depicted in FIG. 10 may also be provided in other computing devices external to the vehicle 500 (e.g., data storage devices, remote server computing devices, and the like).

As also illustrated in FIG. 10, the vehicle 500 (or other additional computing devices) may include a processor 580, input device 520, network interface hardware 584, and a non-transitory memory component 560. The memory component 560 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 560 may be configured to store operating logic 561, input device logic 562, and input logic 563 (each of which may be embodied as computer readable program code, firmware, or hardware, as an example). A local interface 576 is also included in FIG. 10 and may be implemented as a bus or other interface to facilitate communication among the components of the vehicle 500.

The processor 580 may include any processing component configured to receive and execute computer readable code instructions (such as from the data storage component 536 and/or memory component 560). The network interface hardware 584 may include any wired or wireless networking hardware, such as a modem, LAN port, wireless fidelity (Wi-Fi) card, WiMax card, mobile communications hardware, and/or other hardware for communicating with other networks and/or devices.

The input device 520 may be any of the deployable input devices described herein (e.g., a mouse, individual buttons, an array of buttons, and the like). The vehicle further includes the deformable material 504 as described herein, which may be provided as an upholstery material on an arm rest or any other vehicle cabin surface, for example. The sensor layer 506 is configured to detect contact on the deformable material 504 for the determination of a user's hand, as described above. The track system 530 includes any system to move the input device 520 to the detected location of the user's hand.

As stated above, included in the memory component 560 may be the operating logic 561, input device logic 562, and input logic 563. The operating logic 561 may include an operating system and/or other software for managing components of the vehicle 500. Similarly, input device logic 562 may reside in the memory component 560 (or some other remote computing device) and is configured to receive signals and/or data from the sensor layer 506, determine a location of a user's hand on the deformable material 504, control the input device 520 using the track system 530 to move to the location of the user's hand, raise to deform the deformable material 504, and retract back into the enclosure. The input logic 563 is configured to receive input via the input device 520 and provide the input to other systems of the vehicle. It should be understood that the input device logic 562 and the input logic 563 may be provided in the same software module.

It should now be understood that embodiments of the present disclosure are directed to user input systems that include a deformable material and an input device that appears on-demand and at a location that is convenient to the user. More particularly, the user input systems described here may include a sensor layer on or within the deformable material that is used to determine a location of the user's hand. The user input systems may conveniently deploy an input device to the location of the users hand when user input is needed or desired. The input device is stored within an enclosure when not needed, and deforms a deformable material at the location of the user's hand when it is needed or requested.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A user input system comprising:
a base;
a deformable material, wherein at least the base and the deformable material define an enclosure;
at least one actuator coupled to the base and disposed within the enclosure; and
an input device comprising at least one button coupled to the at least one actuator, wherein the at least one actuator is configured to the button to raise the input device to deform the deformable material at a location of a hand on the deformable material based at least in part on a signal provided by the sensor layer.

2. The user input system of claim 1, further comprising:
a track, wherein the input device is coupled to the track; and
at least one track actuator, wherein the at least one track actuator is operable to move the input device in two dimensions on the track.

3. The user input system of claim 1, wherein the input device comprises a mouse.

4. The user input system of claim 3, wherein the mouse is operable to be moved in two dimensions by a user.

5. The user input system of claim 1, wherein:
the at least one button comprises a first button and a second button; and
the at least one actuator comprises a first actuator coupled to the first button and a second actuator coupled to the second button.

6. The user input system of claim 1, wherein:
the input device comprises an array of buttons; and
the at least one actuator comprises an array of actuators coupled to the array of buttons.

7. The user input system of claim 1, wherein:
the input device comprises a light source; and
the deformable material is such that light from the light source passes through the deformable material.

8. The user input system of claim 1, wherein the button on the input device is a physical button.

9. A user input system comprising:
a deformable material defining an enclosure;
a sensor layer disposed on or within the deformable material;
an input device disposed within the enclosure;
at least one processor; and
a non-transitory computer-readable medium storing instructions that, when executed by the at least one processor, causes the at least one processor to perform the following:
detect a user input situation;
receive a signal from the sensor layer;
detect a location of a user hand on the based on the signal;
control the input device to move in two dimensions to a position within the enclosure proximate the location; and
control the input device to raise to deform the deformable material at the location.

10. The user input system of claim 9, further comprising:
a track, wherein the input device is coupled to the track; and
at least one track actuator, wherein the at least one track actuator is operable to move the input device in two dimensions on the track.

11. The user input system of claim 10, wherein the input device comprises a mouse.

12. The user input system of claim 10, further comprising a first actuator and a second actuator, wherein the input device comprises a first button coupled to the first actuator and a second button coupled to the second actuator.

13. The user input system of claim 10, further comprising an array of actuators, wherein the input device comprises an array of buttons coupled to the array of actuators.

14. The user input system of claim 10, wherein:
the input device comprises a light source; and
the deformable material is such that light from the light source passes through the deformable material.

15. The user input system of claim 10, wherein the sensor layer comprises a capacitive sensor layer.

16. The user input system of claim 10, wherein the user input situation is initiated by receipt of a user request.

17. The user input system of claim 10, wherein the user input situation is initiated by receipt of a vehicle request.

18. A vehicle comprising:
an interior surface comprising a deformable material and defining an enclosure; and
an input device comprising at least one button operable to raise and deform the deformable material at a location of a hand on the deformable material, wherein the location is based at least in part on a signal provided by the sensor layer.

19. The vehicle of claim 18, wherein the interior surface is an armrest.

20. The vehicle of claim 18, wherein the input device is a mouse.

* * * * *